June 10, 1958  G. DE CHANGY  2,838,236
ROTARY MULTIPLYING-DIVIDING DEVICE
Filed Dec. 28, 1955  3 Sheets-Sheet 1

June 10, 1958  G. DE CHANGY  2,838,236
ROTARY MULTIPLYING-DIVIDING DEVICE
Filed Dec. 28, 1955  3 Sheets-Sheet 3
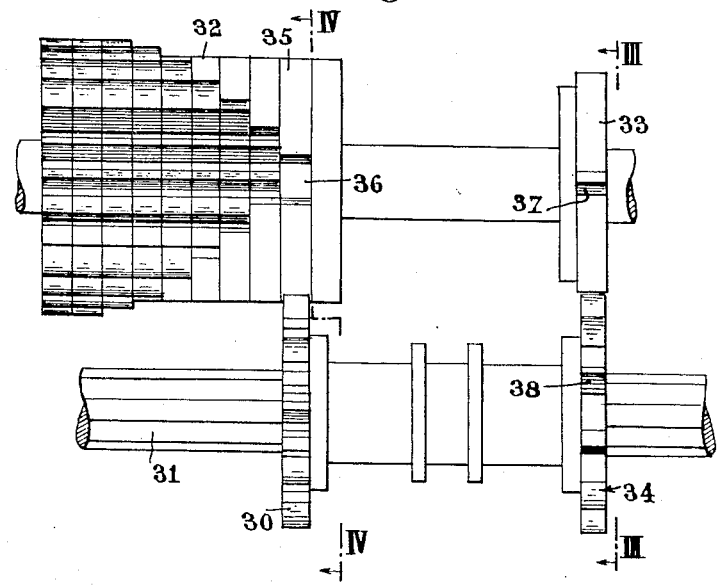
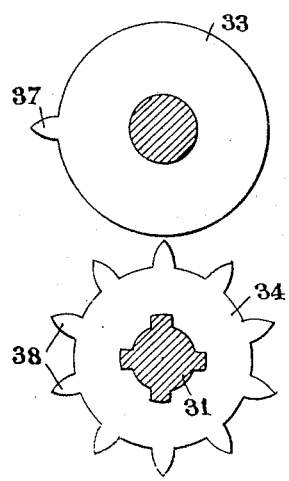
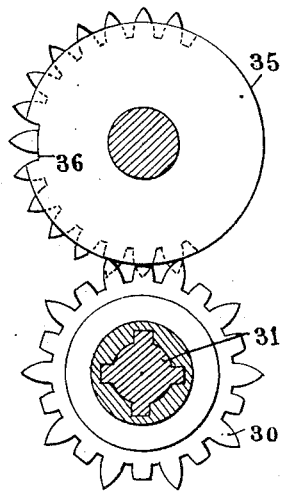

United States Patent Office 2,838,236
Patented June 10, 1958

2,838,236
ROTARY MULTIPLYING-DIVIDING DEVICE

Gilbert de Changy, Clamart, France, assignor to Electricite de France—Service National—Direction des Etudes et Recherches, Paris, France Application December 28, 1955, Serial No. 555,990

Claims priority, application France December 29, 1954

1 Claim. (Cl. 235—63)

The present invention relates to a rotary multiplying-dividing device characterized essentially in that it comprises the following component elements: first differential actuator having a driving shaft and a driven shaft, a group of ten pinions of same diameter mounted on said driving shaft and adapted to constitute the multiplying-dividing drive unit, and an output pinion on said driven shaft, means for selectively bringing said output pinion in meshing relationship with either of said ten pinions keyed on said driving shaft, said ten pinions being so designed that upon each revolution of the driving shaft and according as said output pinion meshes with one or another pinion from said group of ten pinions, said driven shaft will effect from zero to $9/10$ of a revolution, an auxiliary shaft for the multiplicand-divisor, a pair of meshing pinions rotatably fast with said driven shaft and said auxiliary shaft respectively, and such that when the driven shaft will effect $p/10$ of a revolution, $p$ being an integer included between 0 and 9 inclusive, the auxiliary shaft will accomplish $p$ revolutions, as many other ordinal differential actuators similar to the first differential actuator as the desired number of orders in the multiplicand or divisor, each of these other ordinal differential actuators comprising in turn a group of ten pinions all of same diameter and rotatably fast with said auxiliary shaft, and an output pinion, each of these other actuators being adapted to slide along said auxiliary shaft so that one or the other of its ten pinions may selectively mesh with the relevant output pinion, all these output pinions being mounted for loose rotation on a common shaft and in meshing engagement with the input pinions of the successive orders of a totalizer.

According to a preferred form of embodiment of the invention each pinion from the ten-pinion groups comprises a toothed segment with a number of teeth in arithmetical progression of ratio $n$, the first segment having no teeth, and a smooth segment of a diameter slightly smaller than the pitch circle of the teeth, and the output pinions comprise normally $10n$ teeth of which one tooth out of every $n$ teeth is truncated to a diameter slightly smaller than the pitch diameter.

It will be noted that the words "number of teeth of a driving pinion having a toothed segment and a smooth segment" mean the real number of teeth through which the movement of rotation of this pinion, when it represents a complete revolution, causes the output pinion in meshing engagement therewith to rotate.

The attached drawings forming part of this specification illustrate diagrammatically by way of example a specific form of embodiment of the invention. In the drawings:

Figure 2 is a detail view showing an alternate form of embodiment;

Figure 3 and 4 are schematic sectional views taken upon the lines III—III and IV—IV of Fig. 2 respectively.

Figure 1:
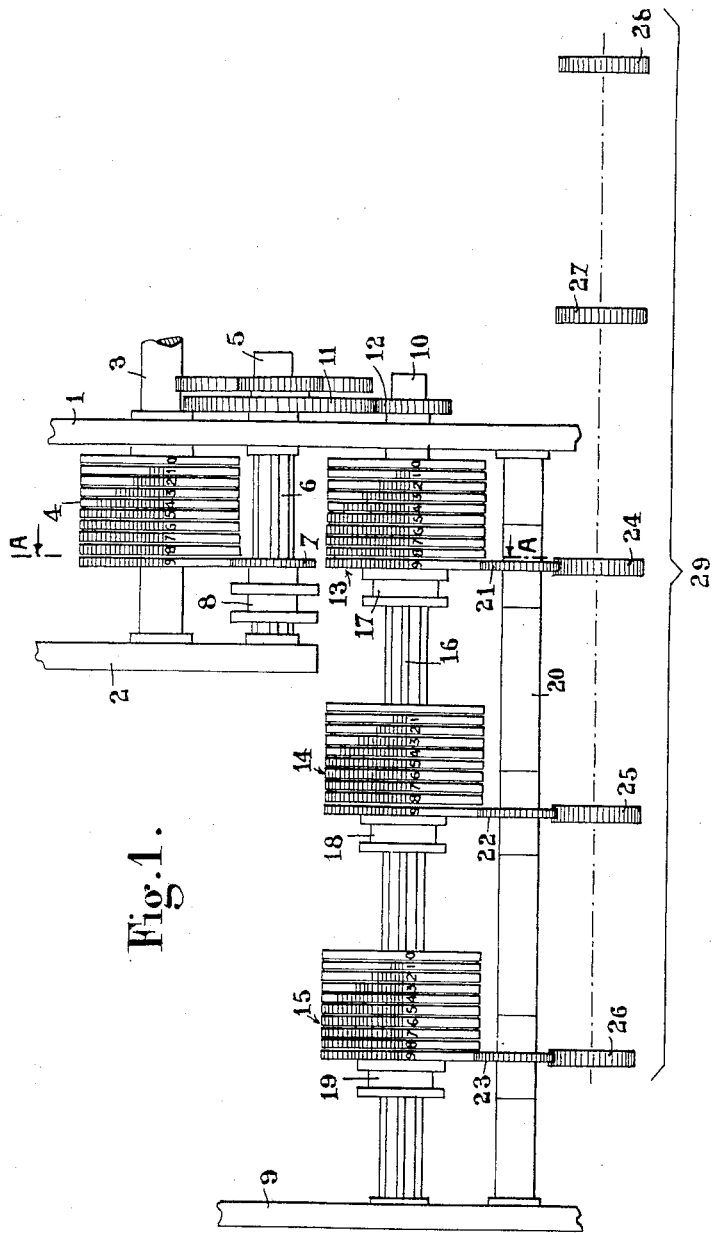
Figure 1 is a schematic view showing the arrangement according to this invention.
Figure 1A:
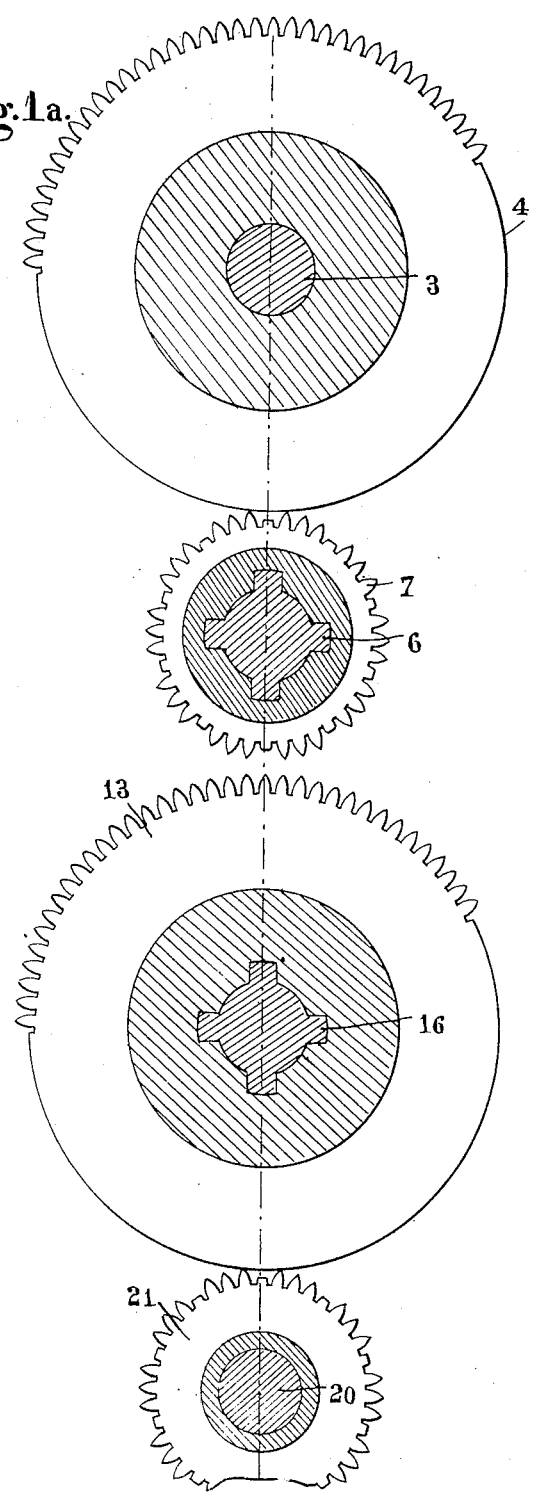
Figure 1a is a schematic sectional view taken upon the line A—A of Fig. 1.

Between a pair of stationary side plates 1, 2 the driving shaft 3 is rotatably mounted and has keyed or otherwise rotatably fastened thereon ten pinions 4 of same diameter, the first pinion having no teeth and the other nine having a number of teeth in arithmetical progression the ratio $n$ of which is greater than 2, and having the remaining portion of their periphery smooth and constituting portions of a cylinder of a diameter very slightly smaller than the pitch circle of the teeth.

Also between the side plates 1, 2 there is mounted the driven shaft 5 having a splined portion 6 on which a pinion 7 is mounted for rotation with, and axial sliding motion with respect to, this driven shaft. This pinion 7 is rigid with a grooved sliding collar 8 adapted to be engaged by a fork member (not shown) for controlling the axial position of the pinion 7 to enable the latter to register with the desired pinion among the pinions 4; the pinion 7 has $10n$ teeth of same pitch and module as those of said pinions 4, one tooth out of every $n$ teeth being truncated down to the pitch circle.

Therefore, according as this pinion 7 meshes with one or another pinion 4, upon each complete revolution of the driving shaft 3 it is moved through one portion of a revolution ranging from zero to nine-tenths, and it remains locked against motion by the cylindrical segment portion of the registering pinion as long as it does not resume its meshing condition therewith.

Between the side plate 1 and another plate 9 the auxiliary shaft 10 for the multiplicand-divisor as explained hereafter is mounted, as shown; this shaft 10 is rotatably driven from the shaft 5 through a pair of meshing pinions 11, 12 keyed or otherwise secured the former on the shaft 5 and the other on the auxiliary shaft 10, these pinions 11, 12 having a ratio of 10:1 respectively.

On this auxiliary shaft 10 are mounted as many ten-pinion ordinal differential actuator groups 13, 14 and 15 as it is contemplated to include orders in the multiplicand or divisor, each group of ten pinions being similar to the group of pinions 4 keyed on the shaft 3; the only difference between this group 4 and those carried by the auxiliary shaft 10 is that the pinions 13, 14 and 15 may slide axially on this shaft 10, the latter being provided for this purpose with splines 16, and that each group of pinions 13, 14, 15 is rotatably fast with a grooved collar 17, 18, 19, respectively, engaged by a relevant fork member (not shown) adapted to permit the adjustment of the axial position of these groups, so that the pinion having the desired number of teeth may be caused to mesh with the corresponding output pinion 21, 22 or 23.

On a stationary shaft 20 carried by the side plates 1 and 9 are mounted for free rotation the aforesaid loose pinions 21, 22 and 23 each meshing with a pinion 24, 25, 26 of different order from the row of pinions 29 of the totalizer of the machine, which also comprises the tens and units pinions 27 and 28.

The spacing between the ten-pinion groups 13, 14, 15 and the loose output pinions 21, 22, 23 is such that by properly actuating the fork members engaged in the grooves of collars 17, 18, 19 it is possible to cause any desired pinion from each of the three groups 13, 14, 15 to mesh with the corresponding pinion 21, 22, 23, these pinions being similar to the pinion 7 of the aforesaid multiplying group.

The operation of this multiplying-dividing device is simple and will be readily understood from the following description of a typical example.

Assuming the multiplication 875 by 947:

The pinion "8" of group 15 is caused to mesh with the corresponding pinion 23, pinion "7" of group 14 is caused to mesh with the corresponding pinion 22, and pinion "5" of group 13 is caused to mesh with the corresponding pinion 21; then the pinion "9" of the multiplying group 4 is caused to mesh with the pinion 7, and the totalizer pinion 24 (indicating the hundreds) is set to mesh with the output pinion 21 of the units, the pinions 25, 26 of higher order of the totalizer meshing automatically with the pinions 22, 23 respectively, of the tens and hundreds of the output row; then the power shaft 3 is allowed to rotate one complete revolution, so that the driven shaft 5 and the auxiliary shaft 10 will respectively accomplish 9/10 of a revolution and nine revolutions, whereby the hundreds, thousands and ten thousands orders of the totalizer will record nine times the number 875, i. e. 7875, and the totalizer as a whole will register 787,500.

Without altering the multiplicand, the pinion 7 of the multiplying group 4 is moved axially by means of the grooved collar 8 so that it will mesh with the pinion "4" of group 4; the totalizer shaft (shown by the chain-dotted line representing the axis of the pinions thereof) is caused to slide axially to move the tens pinion 27 to its meshing position with the output pinion 21 (units) on shaft 20, the other pinions 24 and 25 registering automatically with the pinions 22 and 23; subsequently, the driving shaft is rotated one complete revolution so as to rotate the driven shaft through 4/10 of a revolution and the auxiliary shaft 10 through four complete revolutions; therefore, this auxiliary shaft 10 will cause the totalizer to register four times the number 875 in the tens, hundreds and thousands orders, i. e. 3500.

Then the pinion 7 on the driven shaft 5 will be caused to mesh with the pinion "7" of the multiplying group 4; the driving shaft 3 is rotated through one complete revolution after the totalizer shaft has been caused to slide so that the units pinion 28 meshes with the output pinion 21 of the units on shaft 20 and thus the driven shaft 5 will rotate through 7/7 of a revolution and the auxiliary shaft 10 through seven revolutions; as a consequence of this rotation, the number 875 will be recorded seven times in the units row of the totalizer, to make 6,125.

Therefore, the recorded total will be 787,500+35,000+6,125 i. e. 828,625 or the product of the multiplication of 875 by 947.

To permit this simultaneous operation in the totalizer with pinions of different orders, it is necessary that the totalizer incorporates a deferred-transfer device. Obviously, the same apparatus may be used for effecting divisions.

Of course, it will be readily understood that the form of embodiment shown diagrammatically in the attached drawings and described hereinabove should not be construed as limiting the scope of the invention as it is purely illustrative and since many modifications may be brought thereto without departing from the spirit and scope of the present invention.

Thus, in the form of embodiment shown in Fig. 1 each of the output pinions 7, 21, 22 and 23 have one tooth truncated out of four, whilst the ten pinions of each group 4, 13, 14 and 15 have 0, 4, 8, 12 ... 36 teeth, respectively; however, as indicated hereinabove, this specific arrangement is not compulsory since the output pinions may have one tooth out of $n$ truncated down to the pitch circle, and the pinions of each group of ten pinions may have a number of teeth consistent with an arithmetical progression of ratio $n$ from the first pinion thereof which has not teeth.

However, if $n$ were equal to two, it would not be possible, if special cares were not taken, to cause a pinion having only one tooth out of two truncated down to the pitch circle to take only one unit, i. e. to cause this pinion to move through an angular distance of two teeth only when multiplying by "1."

This result may be obtained by utilizing the arrangement shown in Fig. 2.

In this arrangement, the output pinion 30 having every other tooth truncated down to the pitch circle is rotatably fast with the shaft 31 on which it is slidably mounted so as to be engageable with any one from the group of ten pinions 32 adapted to rotate this pinion 30 through an angular distance corresponding to from zero to nine units, i. e. having from 0 to 18 teeth, each pinion 32 having at least one fraction of their periphery of same radius as the pitch circle of the teeth thereof so as to form a part-cylindrical portion adapted to lock said output pinion 30 against motion as long as it is not in meshing engagement with the teeth of one of the pinions 32.

To avoid the inconvenience set forth hereinabove in the case of a single-toothed pinion, its position 35 being reserved in the group of pinions 32, the pinion is replaced by another pinion 33 provided with a tappet 37 (see Fig. 3) rotatably and axially fast therewith, adapted to cooperate with another pinion 34 rotatably and axially fast with the output pinion 30, the pinion 34 being provided with peripheral tappets 38 representing one-half the number of teeth of the pinion 30; the axial distance between pinions 30 and 34 is such that when the pinion 34 meshes with the pinion 33 the pinion 30 registers with the position 35 reserved in the ten-pinion group 32 for the single-toothed pinion; in this space 35 there is formed a small cavity 36 of a length calculated to enable the output pinion 30 to take one unit, i. e. to progress through the angular distance of two teeth, each time the pinion 33 accomplishes a full revolution as it cooperates with the pinion 34.

The other pinions of the ten-pinion group 32 have 4, 6, ... 18 teeth respectively and cause the output pinion 30 to rotate from 2 to 9 units, i. e. from 4 to 18 teeth upon each complete revolution of the group of pinions 32.

Of course, this modified arrangement may be utilized for the multiplying pinion group as well as for the multiplicand pinion group, each time the output pinions have every other tooth truncated down to the pitch circle.

What I claim is:

A rotary multiplying-dividing device, characterized essentially in that it comprises the following members: a first differential actuator comprising a driving shaft and a driven shaft, a group of ten pinions of same diameter keyed on the driving shaft, said pinions being each formed with a toothed segment having a number of teeth in arithmetical progression of ratio $n$ from a first pinion having no teeth, and with a smooth segment of a diameter very slightly smaller than the pitch circle of the pinion teeth, and an output pinion axially adjustable on the driven shaft to mesh with one or another pinion from the group of ten pinions according to the digit of multiplier, said output pinion comprising normally $10n$ teeth of which one tooth out of $n$ teeth is truncated down at least to the pitch circle, whereby upon each revolution of the driving shaft and according to which pinion from said group of ten the output pinion cooperates, the driven shaft will rotate through from zero to 9/10 of a revolution, an auxiliary shaft for the multiplicand-divisor, a pair of intermeshing pinions, fast with said driven shaft and said auxiliary shaft respectively, such that, when the driven shaft will effect $p/10$ of a revolution, $p$ being an integer included between 0 and 9 inclusive, the auxiliary shaft will effect $p$ revolutions, as many other ordinal differential actuators similar to the first above-referred to as there are orders in the multiplicand or divisor, each of said other ordinal differential actuators comprising a group of ten pinions of same diameter, rotatably fast with said auxiliary shaft and an output pinion, said ordinal differential actuators being slidable axially along said auxiliary shaft so as to selectively cause one or the other of said ten pinions to mesh with the relevant output pinion, according to the respective plural digits of multiplicand or divisor, a shaft on which all of said output pinions are mounted for loose rotation, and a totalizer having its input pinions of the successive orders in driving relation with said output pinions.

References Cited in the file of this patent

UNITED STATES PATENTS

| | | |
|---|---|---|
| 890,888 | Baldwin | June 16, 1908 |
| 1,174,831 | Crumpton | Mar. 7, 1916 |
| 1,482,372 | Bauerle | Jan. 29, 1924 |
| 2,383,731 | Mathi | Aug. 28, 1945 |

FOREIGN PATENTS

| | | |
|---|---|---|
| 370,799 | Germany | May 7, 1923 |
| 462,072 | Germany | July 7, 1928 |
| 188,737 | Switzerland | Apr. 1, 1937 |
| 851,464 | France | Oct. 2, 1939 |